Patented May 26, 1942

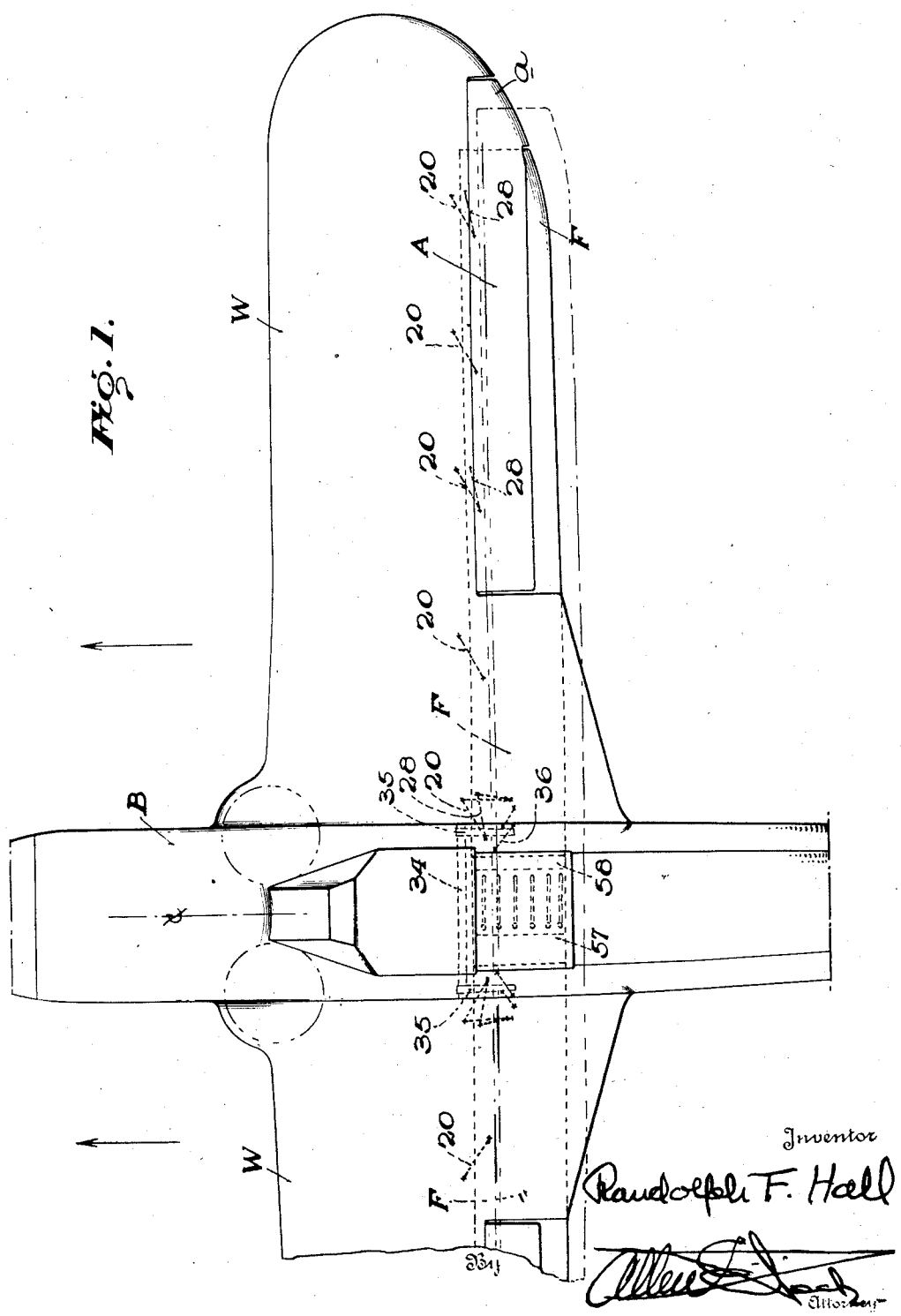

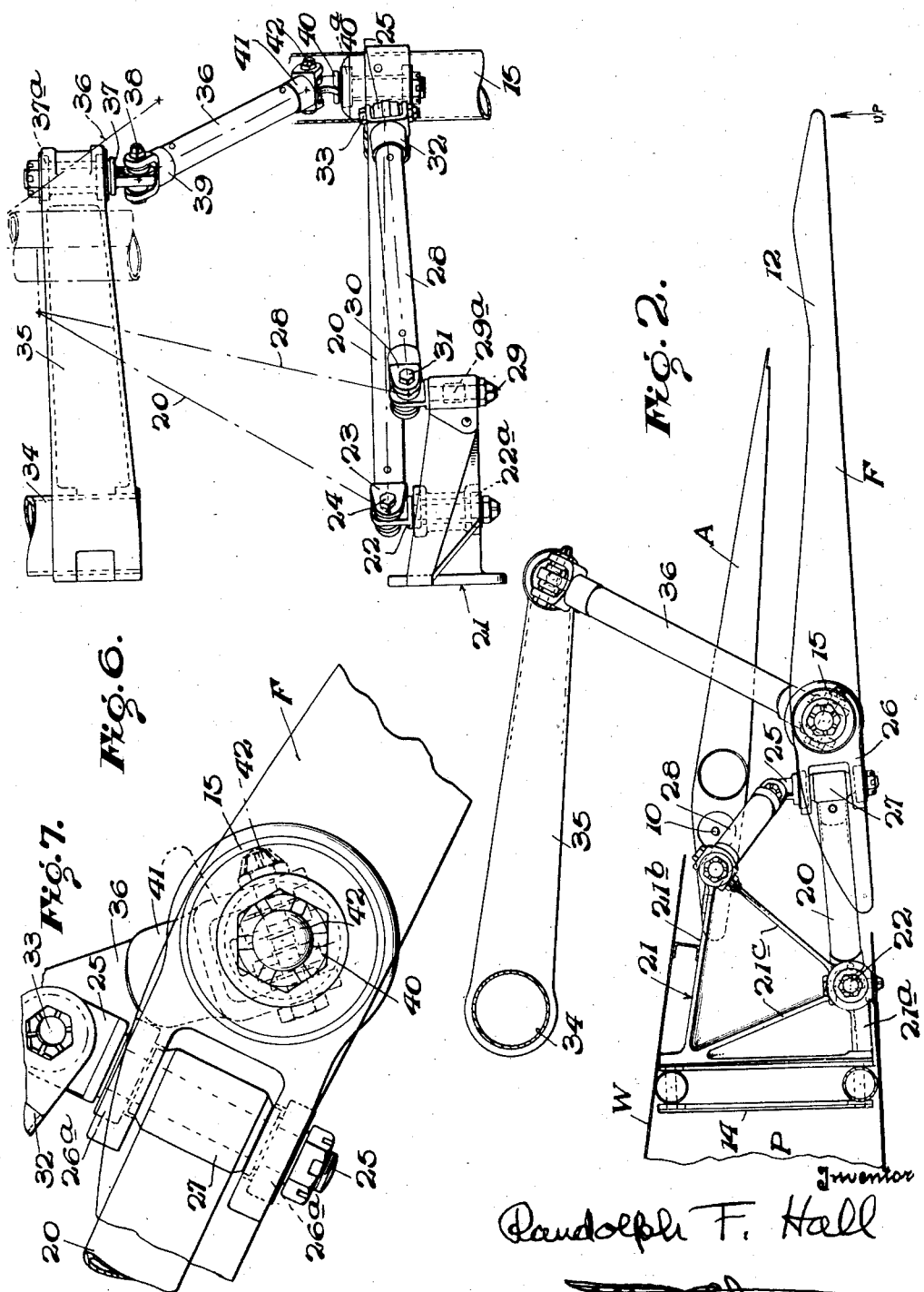

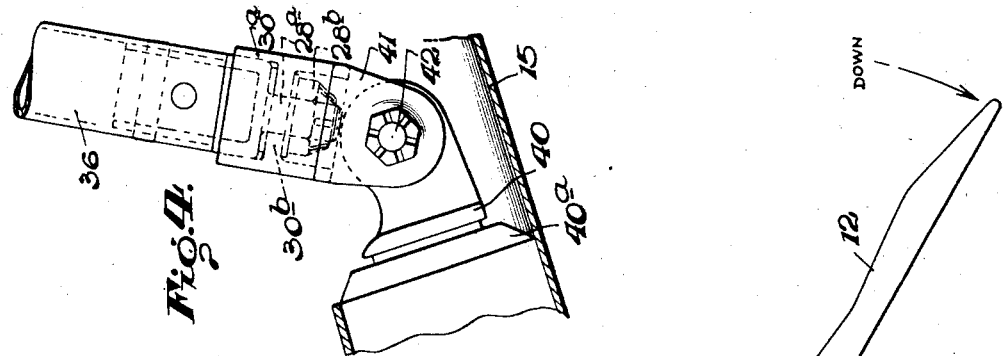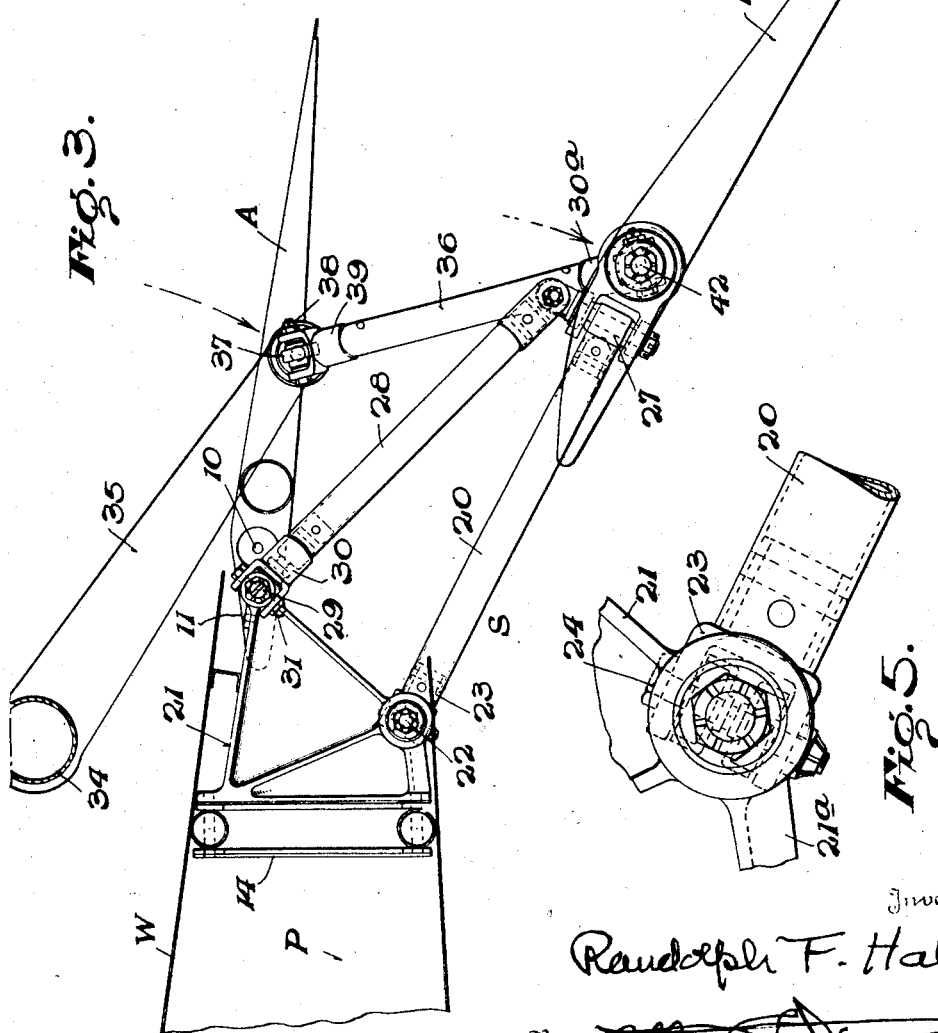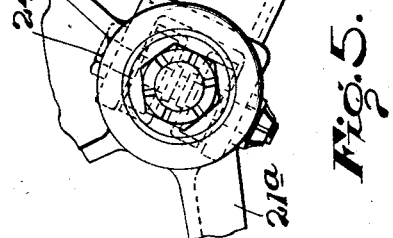

2,284,519

UNITED STATES PATENT OFFICE 2,284,519

AIRPLANE

Randolph F. Hall, Rochester, N. Y., assignor to Bell Aircraft Corporation, Buffalo, N. Y.

Application September 14, 1939, Serial No. 294,965

9 Claims. (Cl. 244—42)

This invention relates to certain improvements in airplanes; and the nature and objects of the invention will be readily recognized and understood by those skilled in the aeronautical and related arts in the light of the following explanation and detailed description of the accompanying drawings, illustrating what I now believe to be the preferred embodiments or aerodynamical and mechanical expressions of my invention, from among various other embodiments, forms, designs, combinations and constructions of which the invention is capable, within the broad spirit and scope thereof.

Various types of so-called wing flaps are in general use for varying or increasing the lift capacity of an airplane wing. Usually such wing flaps take the form of a movable surface or flap member forming a trailing portion of and extending for a distance along the span of the wing, and the movable surface or flap member may be either of the so-called "split flap" type, in which the flap member forms a portion of the trailing under surface only of the wing and is of less depth than the full depth of the wing trailing portion, or of the type in which the flap member is formed of the full depth and thickness of and provides the trailing portion of the wing for the extent of the flap span.

A common characteristic of these various types and forms of wing flaps is a design and mounting that provides for movement of the flap member from its neutral raised position, to positions angularly displaced downwardly, relative to the wing, for the purpose of increasing the wing camber, to thereby increase the lift capacity of the wing. While in certain of these types of wing flaps, the flap primarily functions solely to increase wing lift capacity through increasing wing camber, by the downward angular displacement of the flap, other types of wing flap not only provide for increasing wing camber but also and in addition, provide for further increasing wing lift capacity by increasing the chord and area of the wing through bodily movement or translation rearwardly of the flap relative to the wing. By thus increasing wing camber and wing area, in addition to increasing the wing camber, the ability of the flap to increase the lift capacity of the wing is materially augmented.

Primarily my present invention is broadly directed toward improving the performance and increasing the aerodynamic efficiency of the various types of wing flaps, whether of the type functioning solely to increase wing camber or of the type for both increasing camber and increasing wing chord and area, by increasing the effective span of the flap when the flap is in its wing lift capacity increasing positions, so that the ability of even a full span flap to increase wing lift capacity may be further augmented, while with a flap of the type that increases both wing camber and wing area, the maximum potential ability of the flap to increase wing lift may be approached within practical design and construction limits. In this manner, it is possible to increase the wing lift increments through the medium of such a flap and to thereby enable a reduction in stalling speed of an airplane equipped therewith, with shorter landing and take-off runs; the latter being directly attributable to the increased lift possible with the flap in take-off setting without an appreciable change or increase in relative drag forces established.

In carrying out the broad aim of the invention to increase the ability of a wing flap to increase wing lift capacity by increasing the effective span of the flap, the invention provides as a more specific feature thereof, a flap design and mounting by which the flap may be bodily moved or translated outwardly in a spanwise direction when moved from its normal neutral position, to wing lift capacity increasing positions; and further to provide such a design and mounting that is practically and efficiently adapted for use with flaps of the type having both downward angular displacement and rearward wing area increasing movement to lift increasing positions in order to add to the lift increasing ability of such types of flaps by increasing the effective span thereof.

A particular feature and characteristic of the invention is presented by a design and arrangement of flap mounting and operating mechanism that is structurally and mechanically efficient and that offers a minimum of weight with low operating forces, and by which a wing flap or similar movable surface, can be bodily moved or translated in a spanwise direction, either outwardly or inwardly, as the flap is angularly displaced relative to a wing or an adjacent surface, and/or as the flap is bodily moved or translated in a chordwise direction, such movements of the flap all being carried out substantially simultaneously through the operation of the mechanism from a single operating point or by a single operating member.

A specific feature of such a mounting and operating mechanism of the invention resides in the design and arrangement of flap support members that are characterized by a swinging movement to displace the flap carried thereby angularly relative to a wing or adjacent structure while simultaneously bodily displacing or translating the flap in chordwise and spanwise directions to positions displaced rearwardly and outwardly or inwardly relative to the wing from the normal position of the flap.

One of the problems and difficulties encountered with the so-called wing flaps of the various types hereinbefore referred to as in general use for increasing the lift capacity of a wing, is due to the limitation on the extent of the span of the wing that may be occupied by and along which the flap may be mounted. Primarily, such limitation arises from the fact that the universally employed conventional differentially operated ailerons or roll control surfaces, must be mounted to occupy a portion of the full span of the flap and must be free of interfering structure above and/or below the ailerons in order that the ailerons may be vertically displaced upwardly and downwardly for control. Hence, with such ailerons, or roll control surfaces, it is not possible to extend the flap along that portion of the span of the wing that is occupied by an aileron. The ability of such a partial span flap to increase the lift capacity of the wing is materially less than that of a wing flap extended along the full span of the wing with the corresponding increase in flap span.

One possible solution of this broad problem is presented by the U. S. Patent #1,875,593 issued to me on September 6, 1932. In accordance with such solution, a wing flap of the split type is mounted substantially along and throughout the full span of the wing, and an aileron or roll control surface is mounted along a portion of the span of the wing above said flap, of a type that is movable upwardly only from normal neutral position to control positions angularly displaced relative to the wing. With such an arrangement, the wing flap can be extended below such an aileron and for the full span of the wing, without interference between the aileron and flap in the normal operations of both the aileron and the flap so that the increased performance of a full span flap is thereby attained.

An object of the invention is to provide an arrangement of wing flap and an operating mechanism therefor by which the flap can be bodily moved or translated rearwardly without interfering with an aileron or roll control surface mounted on the wing above the flap.

A further object of the invention is to provide such a wing flap and operating mechanism that not only will permit of bodily rearwardly displacing the flap relative to a wing, but is so designed and arranged to also bodily move or translate the flap in a spanwise direction, either outwardly or inwardly of the wing and without interfering with an aileron mounted on the wing above the flap.

The invention is further featured by the provision of a design and mounting particularly adapted for a split type of wing flap, together with an operating mechanism therefor, where such flap is used in combination with an aileron of the up-only type mounted above the flap, such as the aileron and flap combination broadly typified in the above referred to U. S. Patent 1,875,-593, through the medium of and by which the flap may be operated for not only downward angular displacement to increase wing camber, and for bodily movement or translation rearwardly to increase wing chord and area, but also may be translated or bodily moved outwardly in a spanwise direction to increase the effective span of the flap to thereby attain an increase in the wing lift capacity increasing ability of a full span flap.

A further general object of the invention is to provide a design and arrangement of high lift wing of the type that includes a full span wing flap in combination with a roll control surface or aileron of the up-only type mounted above the flap along a portion of the flap span, that has improved aerodynamic and lateral or roll control characteristics.

Another general object of the invention is to provide a mounting and an operating mechanism for various aircraft control surfaces of the broad flap or movable surface type, by which such a control surface may be translated or bodily moved in a spanwise direction; and further by which such spanwise translation can be carried out with a control surface that is also to be translated or bodily moved in a chordwise direction relative to the surface and/or angularly displaced relative to an adjacent surface or structure.

With the foregoing general features, characteristics, and objects in view, as well as certain others that will be apparent to those skilled in the art, my invention consists in certain novel features in design and in combination, arrangement and construction of parts and elements, all as will be more fully specified and referred to hereinafter.

Referring to the accompanying drawings:

Fig. 1 is a top plan view of a portion of the fuselage and of the opposite wings of an airplane, a portion of one of said wings being broken away, showing full span wing flaps of the split type embodying and mounted in accordance with my invention; and furthermore or less schematically showing an arrangement of mounting and operating mechanism embodying the principles of my invention, for the opposite wing flaps by which said flaps are angularly displaced and moved rearwardly and outwardly in a spanwise direction to wing lift increasing positions;

Fig. 2 is a vertical transverse section taken as through the trailing portion of a wing of Fig. 1, showing the wing flap and its mounting and operating mechanism in normal flap raised position, the up-only aileron above the flap being shown in its neutral control position;

Fig. 3 is a view similar to Fig. 2, but showing the wing flap and its mounting and operating mechanism in rearwardly and outwardly translated and lowered angularly displaced position for increasing the lift capacity of the wing;

Fig. 4 is a detail view in elevation of the mounting and universal connection of a flap operating member to the flap spar, a portion of the spar being in vertical section to show the spar carried bearing and the rotatable coupling of the operating member to the universal connection being shown by dotted lines;

Fig. 5 is a fragmentary detail view in elevation of the universal mounting for the forward end of a swinging flap support member on the fixed bracket secured to the wing structure, a portion only of the bracket and support member being shown;

Fig. 6 is a view in top plan of a flap mounting unit together with the operating member and crank of the flap operating mechanism, in positions with the flap in lowered and rearwardly and outwardly displaced wing lift capacity increasing position, a portion of the spar of the flap only being shown;

Fig. 7 is a detail view showing the mounting and connection of a flap supporting member to the flap and of the flap positioning member to such mounting, a portion only of the flap being shown together with the connection of the flap operating member to its mounting in the flap spar;

Figure 8:
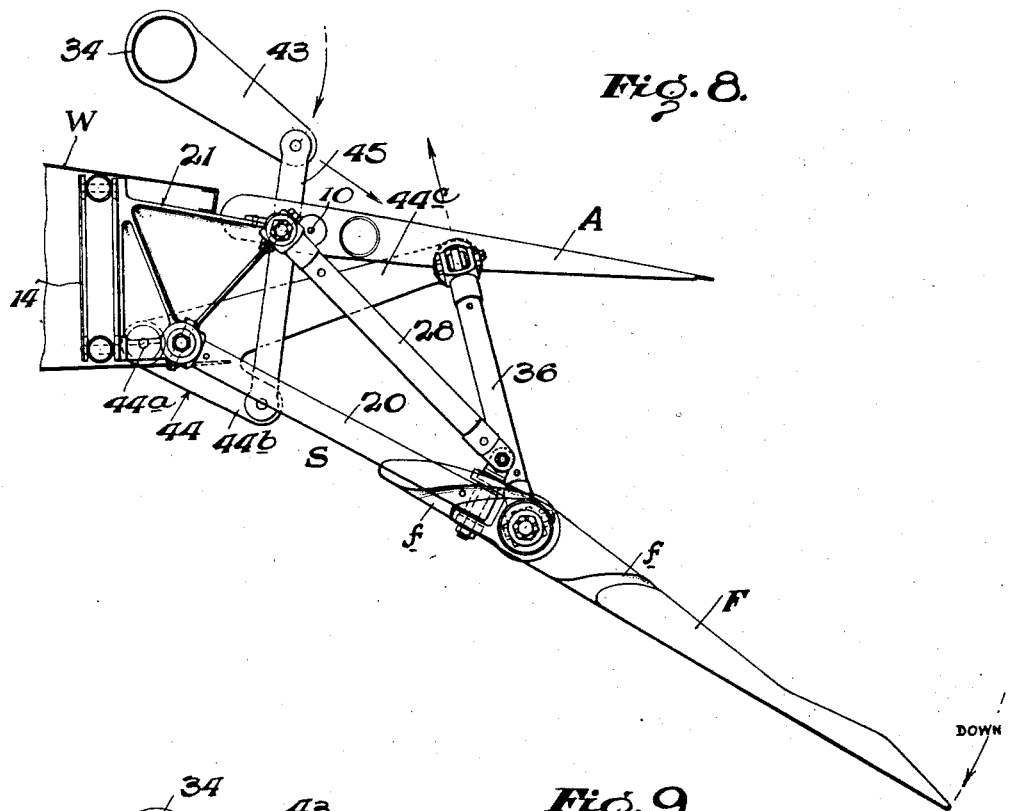
Fig. 8 is a view in vertical transverse section through the trailing portion of a wing, with the wing flap in lowered wing lift capacity increasing position, and showing a modified arrangement of flap operating mechanism.

As an example of one possible adaptation and embodiment of a wing flap with an operating mechanism therefor, embodying the principles and the various features of my present invention, I have selected a flap of the trailing undersurface, or so-called split type, that is mounted and arranged in combination with an aileron or roll control surface of the up-only type, in accordance with the broad combination disclosed in my aforesaid U. S. Patent #1,875,593. This selected example is, however, not used for purposes or intended by way of limitation, but is disclosed principally for the purpose of exemplifying various features of the invention in order to clearly bring forth the principles by which an increased performance and the various advantages of a wing flap designed, mounted and operated in accordance with the invention are attained. The principles and various features of the invention are applicable to and intended for use with various types of wing flaps other than the split type of the illustrated example, or than such split type with ailerons of the up-only type in combination therewith, as will be readily recognized by those skilled in the art, and as will be more particularly brought out hereinafter.

In the illustrated example, referring now to Fig. 1 of the drawings, an airplane is disclosed that includes the fuselage or body B with the opposite wings W of the low monoplane wing type. It so happens that these wings W are disclosed as of the so-called Hall passage-way type of wing that includes a passage-way P (see Figs. 2 and 3) extending longitudinally therethrough, and discharging at the trailing portion of the wing, but it is deemed unnecessary to describe this type of wing herein, reference being made however, to U. S. Patents #1,559,091 and 1,875,593 as examples of this particular type of high lift wing. It is to be clearly understood that my invention is in no sense limited to this particular type of wing, as it is also adapted for use generally with wing flaps or control surfaces or the like, on conventional or other types of airplane wings or lift surfaces, and such general use is contemplated and intended and is included in and forms a part of the disclosures of my invention herein.

Each wing W is provided with a trailing undersurface flap member F of the split type that is essentially and primarily mounted for vertical swinging between normal raised position (see Fig. 2) and downwardly swung, lowered wing lift capacity increasing positions, angularly displaced relative to the wing, to increase wing camber (see Fig. 3). In normal raised position, a flap F forms the trailing portion of the under surface of the normal wing contour, or airfoil section, and in this instance, is of the type mounted for swinging about a hinge axis remote and spaced forwardly from the leading edge of the flap, so that when the flap is in lowered angularly displaced and camber increasing positions, a space or passage is provided between the undersurface of the wing and the leading edge of the flap, such space or passage being generally indicated by the reference letter S in Fig. 3 of the drawings.

Each wing flap F extends substantially for the full span of the wing and, being of the split type, is of less depth or thickness than the over all depth or thickness of the trailing portion of the wing so that an aileron or roll control surface A of the up-only type may be efficiently mounted along a portion of the span of the wing above the wing flap F to form in its normal neutral control position, a trailing portion of the upper surface of the wing W, as will be clear by reference to Fig. 2 of the drawings, in particular. Each aileron A is located along the outer portion of the span of the wing, and is mounted for upward swinging about a hinge axis 10, referring now to Figs. 2 and 3 of the drawings, with the portion of the aileron extending forwardly from the hinge axis forming an aerodynamic balance 11 for reaction of the air thereon within the wing air displacement passage P. In the specific design and arrangement of the combination of split type flap with an up-only aileron thereabove of the present example, each aileron A extends outwardly a distance beyond the outer end or tip portion of the flap F therebelow, while the flap extends rearwardly a distance beyond the aileron, so that the flap trailing edge is spaced rearwardly a distance from the aileron trailing edge as will be clear by reference to Fig. 1 of the drawings.

Each aileron A is designed and mounted to have up movement to control positions, in accordance with the principles described and explained in my U. S. Patent #1,875,593 and the opposite ailerons A of the wings W are operatively coupled with and into any suitable control mechanism, such, for example, as a mechanism of the general character shown in the aforesaid U. S. patent, so that it is considered unnecessary to show or describe a suitable aileron operating mechanism for the ailerons hereof. With the ailerons A of the up type as disclosed, each wing flap F of a wing W may thus be extended for and throughout substantially the full span of the wing, and beneath an aileron A, without interfering with the normal roll control operation of the aileron, in order to obtain the increased flap effectiveness over a partial span flap. The flaps F may each be provided with a span-wise recess or depressed portion 12 along the upper surface thereof throughout the span of an aileron A thereabove, so as to provide operating clearance for limited down swinging of the aileron A with the flap in its normal raised position. Such broad arrangement of recessed flap with up aileron thereabove is disclosed in the U. S. Patent #2,166,292 issued to me July 18, 1939 and may be utilized in those up aileron control systems in which it is desired that the aileron opposite an upwardly moved aileron have a limited down movement.

The opposite wings W are, in this instance, of the low monoplane wing type, and if desired, or found expedient, the inner ends of the opposite wing flaps may be connected by the flap connecting and extending unit consisting of the opposite panels 57 and 58 which are overlapped at their inner ends in sliding engagement through the medium of suitable pins and slots (see Fig. 1) in accordance with the disclosures of such a unit as found in the U. S. Patent #2,122,154 issued to me March 22, 1938. Such unit, consisting of the panels 57 and 58 carried by the opposite inner ends of the wing flaps F, respectively, forms a continuation of the flaps F beneath the fuselage or body B to thereby provide, in effect, a continuous flap structure extending between the opposite wing tips. It is to be understood that the invention is not limited or restricted to the use of such a flap extending unit or its equivalent, but the use of such unit, where the design of airplane and type of wing used will permit, adds to the ability of the flaps to increase the lift capacity of the wing by increasing the effective flap structure in both span and area.

In accordance with the principles of my present invention, each flap F is not only mounted for downward swinging to angularly displaced positions relative to the wing, but is also bodily movable rearwardly to increase the chord of the wing and in addition is bodily movable in a spanwise direction, preferably outwardly, in order to further increase the effective span of the flap. In the preferred forms of flap of my invention, all of these movements are carried out so that the flap in these wing lift capacity increasing positions, is angularly displaced downwardly relative to the wing, is moved bodily rearwardly, and is moved bodily outwardly in a spanwise direction relative to the wing, but my invention is not limited or restricted to the use of all three such movements or translations of the flap, as, for example, the flap may be moved rearward and outward without angular displacement.

The mounting and the operating mechanism for the wing flaps F of the present example by which the combined movements of the flap are obtained for angular displacement downwardly for rearward translation, and for the bodily movement or translation of the flap in a spanwise direction to increase the effective span of the flap, includes the swinging gate or flap supporting members or arms 20, located on a wing W at intervals spaced along the span of the flap F, in fixed position secured and connected to the wing structure. Any desired number of such swinging support arms or gate members 20 may be utilized as may be found expedient, depending upon the length of the span of the flap, but in the embodiment of the present example, shown in Fig. 1 of the drawings, five of such swinging support members 20 happen to be shown.

The mounting of these flap support arms or swinging gate members 20 on the structure of a wing W, is illustrated in detail in Figs. 2, 3, 5, and 6 of the drawings in particular, and embodies in each instance a vertically disposed bracket structure 21 enclosed within the wing and fixed to and extending rearwardly from the rear wing beam 14. Each of these bracket structures includes a rearwardly extending lower arm 21a and an upper arm 21b thereabove that extends rearwardly a distance beyond the lower arm 21a to a point spaced rearwardly from the leading edge of the balance portion 11 of an aileron A. The balance portion 11 of the aileron A is cut away to provide a space to receive arm 21b of the bracket structure so as to prevent interference between such structure and the aileron and thus provide operating clearance for the latter throughout its range of vertical displacement. These upper and lower arms 21b and 21a of a bracket structure 21, are connected by suitable inter-bracing 21c, and the lower arm thereof has a horizontally disposed transverse bearing housing at its rear end in which an eye bolt 22 is rotatably journalled or mounted in suitable ball or anti-friction bearings 22a with such eye bolt 22 thus disposed in horizontal position, transversely of the bracket arm.

A swinging flap support arm or gate member 20 is mounted and supported on each bracket structure 21 in position extending rearwardly therefrom for vertical swinging and for lateral or horizontal swinging. Such mounting of an arm or gate member 20 for vertical and lateral swinging is carried out by providing a jaw member 23 in fixed position on the forward end of an arm 20, with the opposite jaws thereof vertically spaced, and pivotally coupling such jaw member to the apertured end of the eye bolt 22 by the pivot pin 24. Thus, each arm or gate member 20 is mounted at its forward end to a bracket structure by what is in effect a universal coupling that permits vertical swinging of an arm about the axis of an eye bolt 22, and lateral or horizontal swinging about the axis of the pivot pin 24 that couples the forward end of the arm to the eye bolt 22, as will be clear by reference to Fig. 6 of the drawings in particular.

A wing flap F of a wing is mounted on and carried by the rear or trailing ends of the flap support arms or swinging gate members 20, with the flap maintained against vertical movement relative to such arms but being bodily movable in a horizontal or lateral direction relative to said arms and spanwise of the wing and flap. For instance, referring now to Fig. 7 in connection with Figs. 2 and 3, the rear or trailing end of each swinging flap support arm 20, is fixed to a vertically disposed eye bolt 25 rotatably mounted within the flap F forward of the flap spar 15, by means of a collar or the like 27, clamped or otherwise suitably fixed to eye bolt 25. Each eye bolt 25 is rotatably mounted in the opposite, vertically spaced jaws of a jaw member 26 that is fixed to and extends forwardly from the flap spar 15, suitable ball or anti-friction bearings 26a being provided in the opposite jaws of member 26 in which eye bolt 25 is rotatably journalled. The flap F is cut away or recessed to provide spaces for the arms 20, and such recesses are formed of sufficient width spanwise of the flap to permit lateral or horizontal movements of the arms relative to the flap F without interference between such arms and the flap.

With such mounting of a flap F on the swinging flap support arms 20, the flap is vertically swingable on and with such arms about the remote hinge axes provided by the wing bracket carried eye bolts 22 spaced forwardly from the leading edge of the flap, so that the flap may thus be swung downwardly from normal raised position (see Fig. 2) to lowered positions angularly displaced relative to the wing to increase wing camber (see Fig. 3). If the swinging support arms 20 with the flap in its normal raised position are swung forwardly about the pivot pins 24, so that such arms are in angularly disposed positions inclined inwardly and rearwardly, then when the flap is swung downwardly with outward and rearward swinging of the arms 20, the flap is not only angularly displaced downwardly, but is also simultaneously bodily displaced rearwardly and bodily displaced outwardly in a spanwise direction, as the arms 20 are swung rearwardly and outwardly. In this manner, the flap F, by its bodily rearward movement increases the chord and area of the wing, and by its bodily spanwise movement outwardly increases the effective span of the flap.

In order to position and guide the flap F and its swinging supporting arms 20, to cause the flap to move bodily rearwardly and to move bodily outwardly in a spanwise direction as the flap is swung downwardly about the forwardly spaced hinge axes formed by the eye bolts 22, suitable flap positioning members 28 are provided in operative connection between the wing carried brackets 21 and the flap F. Each of such flap positioning members 28 is connected at its forward end to a bracket structure 21 by a universal coupling arrangement that includes a horizontally disposed eye bolt 29 that is rotatably journalled in suitable anti-friction bearings 29a in a bearing housing or casing carried by the rear end of the bracket structure arm 21b transversely of such arm in a spanwise direction relative to the wing W. A jaw member or forked fitting 30 is pivotally coupled to a pivot pin or bolt 31 that is carried by the apertured end of the eye bolt 29, such bolt or pin 31 being vertically disposed transversely of the axis of the eye bolt 29 so that the jaw member 30 is vertically swingable by rotation of bolt 29 in its bearings and is also laterally swingable about pivot pin 31 as an axis. The jaw member 30 is rotatably mounted on the forward end of a flap positioning member 28 for rotation of member 28 relative to jaw member 30, and about the axis of member 28.

As an example of a possible form of rotatable mounting of the forward end of a flap positioning member 28 to a jaw member 30, reference is made to Fig. 4 of the drawings in which such a rotatable mounting is shown as applied to another member or arm of the flap operating mechanism but which is identical with such mounting utilized for mounting the jaw members 30 to the flap positioning members 28. An axially extending stud 28a is provided extending from the forward end of a positioning member 28, and the sleeve or socket 30a of the jaw fitting 30 is provided with a transverse web or wall 30b there across in the base of such socket member, such web or wall being formed with a center bore or aperture therethrough. The stud 28a of the positioning member 28 is rotatably received in and extending through the bore of web 30b and a nut 28b is threaded onto the inner end of the stud 28a to retain the same against displacement and to thereby secure the jaw fitting to the forward end of a positioning member 28. If desired, any suitable anti-friction bearings may be provided between the web 30b and the stud and its associated structure.

Each flap positioning member 28 extends rearwardly from a bracket carried eye bolt 29 to the upper apertured end or eye of the flap mounted eye bolt 25, referring now particularly to Fig. 7 of the drawings, and a suitable fork fitting or jaw member 32 is secured to the rear end of the flap positioning member 28 which jaw member 32 receives and fits over the eye of bolt 25 and is pivotally connected thereto by the horizontally disposed pivot pin 33 extended through the jaws of the jaw member and the eye of bolt 25. Thus, the rear end of each flap positioning member 28 has a universal coupling with a flap F through the medium of the vertical axis provided by the eye bolt 25 carried by the flap and the horizontal axis provided by the pivot pin 33 which couples the jaw member 32 carried by the rear end of member 28 to the upper end of the eye bolt 25. In the example hereof, the flap support members 20 are pivotally coupled to the eye bolts 22 at the inner side of the bracket members 21 and similarly the forward ends of the flap positioning members 28 are coupled to the bracket carried eye bolts 29 at the inner sides of the bracket members and substantially above, but spaced slightly outwardly and to the rear of the forward ends of the flap supporting members 20. However, the rear ends of the flap positioning members 28 are pivotally attached to the same eye bolts 25 to which the flap supporting members 20 are pivotally connected so that the pivotal connections of the rear ends of these two members lie in the same vertical plane, and the positioning members are inclined slightly inwardly from their forward end couplings to their rear end couplings to the eye bolts 25.

Any desired number of the flap positioning members 28 may be employed in any particular flap installation, but as in the example hereof shown by Fig. 1 of the drawings, such flap positioning members 28 may be provided only at certain of the series of flap supporting arms 20, because, in the average installation, except for very large span flaps, it would not be necessary to provide a flap positioning member 28 except at the inner portion of the flap, midspan of the flap, and at the outer portion of the span of the flap, respectively, irrespective of the number of flap supporting arms or members 20 that may be employed in the particular installation.

With the arrangement of swinging flap support arms or gate members 20 and the flap positioning members 28 of the particular example herein disclosed, when a flap F is in its normal raised position, such as shown by Fig. 2 of the drawings, the flap support arms or gate members 20 and the flap positioning members 28 are swung to angularly disposed positions extended rearwardly and inwardly from the wing carried bracket structures 21, as shown by dotted lines in Fig. 1 of the drawings. Due to the relative locations of the axes of the members 20 and 28, when the flap F is swung downwardly with the arms or gate members 20, to angularly displaced positions relative to the wing, the members 20 and 28 will cause bodily movement or translation of the flap rearwardly and bodily movement or translation of the flap outwardly in a spanwise direction to positions increasing the chord of the wing and increasing the effective span of the flap, as shown by the dot and dash lines in Fig. 1 and to the position angularly displaced relative to the wing as shown in Fig. 3.

The opposite wing flaps F are positively coupled for simultaneous operation by means of an operating mechanism that includes, referring now to Fig. 1 of the drawings, the horizontally disposed torque tube or shaft 34 that extends transversely across the fuselage or body B and which is mounted or journalled in suitable supporting bearings (not shown) in the body, for rotation therein about the longitudinal axis of the tube or shaft. This torque tube 34 is provided at its opposite ends with the crank arms 35 respectively, each of which extends rearwardly from the tube adjacent but spaced inwardly from the innermost flap supporting arm 20 and positioning member 28 of the adjacent wing flap F. Each crank 35 is operatively connected and coupled with the adjacent wing flap F by means of the operating member or link 36 that is coupled by universal coupling arrangements between the rear end of a crank and the flap F at the flap spar 15.

Each crank 35 is provided with an eye bolt 37 disposed in horizontal position transversely of the rear end of the crank and suitably journalled thereon in anti-friction or the like bearings 37a for rotation about a horizontal axis. The eye or apertured end of the eye bolt 37 is disposed at the outer side of the crank 35, and the upper forward end of the operating member or link 36 is provided with a fork fitting or jaw member 39 that receives and is pivotally coupled to the apertured eye end of bolt 37 by means of the pivot pin 38. Thus, a universal coupling is provided by which the upper forward end of an operating member 36 is connected to the adjacent crank arm 35 of the torque tube or shaft 34.

Each of the operating members or links 36 of the opposite wing flaps F is coupled at its lower or rear end to its respective flap at the spar 15 of such flap. For example, referring to Figs. 4 and 6 of the drawings, an eye bolt 40 is rotatably journalled in suitable anti-friction bearings 40a mounted in the flap spar 15 in position concentric and axially aligned with the axis of the spar at a location in the spar to the rear of the spar carried jaw fitting 26 that is provided for the innermost of the series of flap support arms 20, with the eye or apertured end of such bolt 40 located at the inner end of the bolt. The flap spar 15 is cut away through its upper wall to form an opening around the eye end of bolt 40 and the lower or rear end of the operating member 36 is extended through such opening. A forked fitting or jaw member 41 is rotatably mounted on the lower end of an operating member 36 and such jaw member is pivotally coupled to the eye of eye bolt 40 by means of the pivot pin 42 which couples the eye bolt to the jaw member 41. The arrangement of the mounting and operating mechanisms is such that it is necessary for an operating member 36 to have rotational movement in or relative to the jaw fitting 41 and such rotational mounting may be provided in the form such as shown in Fig. 4, and described hereinbefore in connection with jaw fitting 30 on the arm positioning members 28. By the foregoing coupling arrangement, each operating member or link 36 is provided with a universal coupling with the flap spar and the operating members 36 are rotatable in and relative to the jaw fittings 41 that couple these members to the flap spar carried eye bolts 40.

In operation, when the opposite flaps F are in their normal raised positions, the flap supporting and positioning members 20 and 28 and the flap operating mechanism that includes the opposite cranks 35 and operating members or links 36 are in the positions shown by dotted lines in Figs. 1 and 6. Upon rotation of the torque tube or shaft 34 to swing the opposite end cranks 35 downwardly, the operating members 36 are moved downwardly and the flap positioning members 28 are swung outwardly and rearwardly to thereby simultaneously move and displace the opposite flaps F both bodily rearwardly and bodily outwardly in a spanwise direction as the flaps are angularly displaced downwardly about the forwardly spaced hinge axes provided by the eye bolts 22 to the position of the flaps F shown by the dot and dash lines in Fig. 1, and in full lines in Fig. 3. It is to be noted that in the foregoing operation of the flaps, the swinging flap support arms or gate members 20 are free to move from their inwardly and rearwardly inclined positions as the flap positioning members 28 project the flaps outward and rearward, with the flaps simultaneously angularly displaced downward, such flap positioning members swinging or pivoting on the gate members 20 about the eye bolts 25 as axes but also remaining fixed in relation to a transverse plane through gate members 20 that passes through the center of the flap spar and the axes of the eye bolts 22.

The predominant stress in the various members of the mounting and operating mechanisms is due to axial forces. The swinging flap support arms or gate members 20 will carry some bending forces, depending upon the distance of the center of pressure of the flap air load from the points of attachment of the members 20 to a flap. At stations along the span of the flap, where the members 20 and 28 are remote from the operating member or link 36 (see Fig. 1), the air force is resolved into the members 20 and 28 and the flap spar 15, with the resultant of the latter being reacted at the operating point for an operating member 36.

With the opposite wing flaps F in their positions increasing the lift capacity of the wing, and displaced angularly downwardly, bodily rearwardly and bodily outwardly in a spanwise direction, the flaps are returned to their normal raised positions with rotation of the torque tube 34 in a direction to swing the cranks 35 upwardly so that the flap operating members 36 are raised and, due to the positioning members 28, the flaps will be bodily displaced forwardly and bodily displaced in a spanwise direction inwardly to their normal raised positions as shown in Figs. 1 and 2 of the drawings.

If the opposite wing flaps F are of the automatically operating type in which an operating force is applied to the flap system from a source of energy within the body or fuselage B, such for example as in the flap operating system disclosed in U. S. Patent #2,112,154, issued to me March 22, 1938, then the initial force unit of such a system, such as the unit U of the aforesaid patent, may be operatively coupled to the torque tube or shaft 34 and apply its forces thereto acting in a direction to normally rotate the shaft to displace the flaps to their wing lift capacity increasing positions. It is to be understood, however, that the invention contemplates and includes the use of various other means for operating the flap systems, such as means of the manual or of the power operated types, or the opposite flaps F may be fully automatically operated solely by and in accordance with air flow conditions to which the flaps may be subjected in flight.

Figure 9:
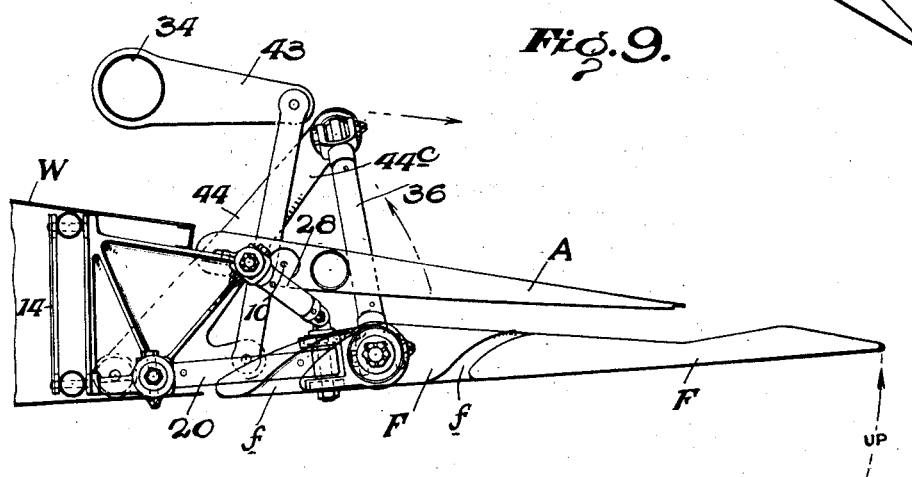
Fig. 9 is a view similar to Fig. 8, showing the flap and its mounting and operating mechanism in raised position.

A modified form and arrangement of flap operating mechanism is disclosed in Figs. 8 and 9 of the drawings, and such mechanism is primarily designed for the purpose of reducing the degree or extent of initial down movement or displacement of the flaps from their normal raised positions, as the torque tube 34 is rotated to lower the flaps. This modified operating mechanism reduces the possible play in the flap system and further calls for a smaller initial operating force and develops a lower initial operating moment than the operating mechanism of the form hereinbefore described in connection with Figs. 1 to 7 of the drawings. This modified operating mechanism of Figs. 8 and 9 presents certain advantages under the conditions of certain flap installations.

Referring to Figs. 8 and 9 in which only one wing flap F of a system of opposite flaps is shown, the torque tube or shaft 34 is provided at its opposite ends with the cranks 43 which are each of a shorter length or have a shorter arm than the cranks 35 of the operating mechanism of Figs. 1 to 7. An operating crank 44 is pivotally mounted to the rear wing beam 14 at the rear side of said beam at the inner side of a bracket structure 21 for vertical swinging about a horizontally disposed pivot 44a. The crank 44 is preferably provided with a base of considerable width in order that the crank may carry considerable side loads that are imposed thereon through its operative connection to member 36. This crank 44 includes the lower rearwardly extended short arm 44b and the upper long arm 44c which is angularly disposed relative to the arm 44b. The rear end of arm 44b is pivotally coupled with the rear end of crank 43 by means of a link 45 so that vertical rocking of the crank 43 by the torque tube 34 will rock crank 44 to raise and lower the rear end of the upper crank arm 44c. The operating member 36 that is universally coupled at its lower end to the spar 15 of a flap F, is also universally coupled at its upper end to the rear end of the long crank arm 44c of crank 44, such universal coupling taking the form of the coupling provided between the crank 35 and the operating member 36 of the form of operating mechanism of Figs. 1 to 7 as hereinbefore described.

The operating mechanism of this modified form is disclosed in Fig. 9 with the flap F in its normal raised position. In such position, the crank 44 is swung upwardly to elevate the rear end of the crank arm 44c thereof to thus raise the operating member 36 to the position with the flap F in its normal raised position. The relative positions of the swinging flap support arms or gate members 20 and the flap positioning members 28, is substantially the same as that disclosed and described in connection with Figs. 1 to 7 of the drawings. In order to displace the flap F rearwardly and outwardly in a spanwise direction, and at the same time angularly displace the flap downwardly, torque tube 34 is rotated to lower crank 43 and thus rock the arm 44c of crank 44 downwardly. Downward movement of crank arm 44c forces the operating members 36 downwardly and the flap is angularly displaced downward and bodily displaced rearwardly and outwardly by the arrangement of the members 20 and 28 as hereinbefore described. The maximum lowered and rearwardly and outwardly displaced position of flap F and the lowered positions of cranks 43 and 44 is disclosed in Fig. 8 of the drawings. It will be obvious that in operating the mechanism from the position shown in Fig. 9 to the flap lowered position shown in Fig. 8, the initial down movement of the flap is reduced over that of the flap when operated by the mechanism of Figs. 1 to 7, due to the inter-position and arrangement of the crank 44 with its arms 44b and 44c while the crank 44 and its mounting are designed to carry the side loads imposed thereon due to the slope or inclination of operating member 36 between crank 44c and flap F.

As shown in Figs. 8 and 9, the flap F may be provided with the spanwise disposed slots f in order to increase the efficiency of the flap in accordance with the principles disclosed in the U. S. Patent #2,118,705, issued to me on May 24, 1938.

Attention is here directed to the particular design and arrangement of the ailerons A above the opposite wing flaps F by which these ailerons, referring now to Fig. 1 of the drawings, have a spanwise extension a that overhangs or extends beyond the flap in order to obtain a beneficial effect on the lateral or roll control characteristics of the ailerons, especially when the flaps are in their normal raised positions. An aileron extension a is usually of full depth or thickness of the wing, in order to form the trailing portions of both the upper and lower surfaces of the wing for the area of this flap extension a. Preferably the depth or thickness of each flap F is reduced to a minimum near its outer tip in order to avoid interference with an aileron A thereabove, or with the wing structure thereabove in the event that there is no aileron extension a, as a flap F is displaced or slides outwardly and rearwardly beneath an aileron A as the flap moves downwardly.

Further, in the particular design and arrangement shown, utilizing the passage-way wing of the Hall type, the controls (not shown) for the ailerons A may be interconnected with the flap system in order to cause simultaneous and co-related movement of an aileron A with a flap F in accordance with the principles disclosed in the U. S. Patent #1,992,157 issued to me February 19, 1935.

It is possible, by reversing the angular position of the flap support members 20 and positioning members 28 so that such members with a flap in normal raised position will extend inclined outwardly and rearwardly instead of inwardly and rearwardly, to cause displacement of the flap bodily inwardly in a spanwise direction, instead of outwardly as in the example disclosed in the drawings hereof. Such arrangement may be utilized where it is desired, for example, to increase the angle between the landing gear wheel of a landing gear and the tip of the lowered flap, or where it might be desired to eliminate the central flap extension unit embodying the panels 57 and 58, so that the flaps will move toward each other as the opposite flaps are displaced and meet or overlap in their lowered positions. With respect to the central flap extension unit 57—58, where tail buffeting is encountered, such unit can be eliminated and dependence placed upon the outward flap movement and displacement. The possibility of this tail buffeting condition is, however, materially reduced where, as in the design and arrangement shown herein, an air passage or space S is provided above the flap structure when in lowered position.

The degree or extent of rearward displacement and of outward or inward spanwise displacement and of downward angular displacement, as well as the forces acting in the system, can be controlled and varied or adjusted, by changing the relative disposition and positions of the members 20, 28 and 36, either singly or in combination. In connection with any change in the relative location of the operating member 36, attention is directed to the fact that for certain airplane design arrangements, the operating members 36 may be located below or underneath the flaps F and extend to operating mechanism also located below the flaps.

It is to be noted that the spanwise outward moving flap, without the central flap extension unit, provides space for vision which might otherwise be blocked by the lowered flap, particularly for an airplane having a parasol mounted wing equipped with the flap. The trailing portion of the flap near its inner end could also be cut away to improve the vision when the flap is lowered, if so required.

By applying the broad principles of the invention as hereinbefore disclosed and explained, it is possible to provide for increasing the performance and effectiveness of wing flaps by bodily displacing such flaps in a spanwise direction when the flaps are downwardly displaced to camber increasing positions as well as to bodily displace the flaps rearwardly in a chordwise direction to thereby increase the effective chord and area of the wings on which such flaps are mounted. An efficient mechanism for mounting and operating the flaps by which such movements and displacements of a flap may be simultaneously carried out, is provided by the invention, which mounting and operating mechanisms are of such a character as to be particularly effective with full-span flaps of the type and combination with ailerons or roll control surfaces mounted thereabove, and when embodied in a full span flap mounting and installation, by providing for increasing the effective span of the flap, obtains a material increase in the performance of the flap by augmenting the ability of the flap to increase the lift capacity of the wing.

Attention is here directed to the fact that the invention is not limited or restricted to use with lift capacity increasing wing flaps but is of general adaptability to control surfaces or other movable surfaces where it may be desired to obtain movement or translation of a surface in a spanwise and/or chordwise direction. Therefore, the term "control surface" as used herein and in the appended claims, is to be given a broad and basic definition to cover and include movable surfaces generally.

It is also evident that various changes, modifications, variations, substitutions, eliminations and additions might be resorted to without departing from the broad spirit and scope of my invention and hence, I do not wish to limit or restrict myself in all respect to the exact and specific disclosures made herein by way of example.

What I claim is:

1. In combination, an aircraft wing, a flap forming a trailing portion of said wing, said flap being adapted to be swung downwardly from normal raised position to lowered positions angularly displaced relative to the wing, a series of flap support members located at spaced intervals on the wing along the span of the flap, said members being universally coupled at their forward ends to the wing and being pivotally connected to the flap at their rear ends about vertically disposed axes, whereby said flap is movable downwardly with said members to positions angularly displaced relative to the wing and is bodily movable in a spanwise direction by lateral swinging of said arms.

2. In combination, an aircraft wing, a flap forming a trailing portion of said wing, said flap being adapted to be swung downwardly from normal raised position to lowered positions angularly displaced relative to the wing and to be bodily displaced in a spanwise direction, and a mounting means for said flap including a flap support member universally coupled at its forward end to the wing for vertical swinging and for lateral swinging, the rear end of said member being pivotally connected to the flap about a vertically disposed axis, and a flap positioning member universally coupled at its forward end to the wing and universally coupled at its rear end to the flap, whereby downward swinging of said flap with said support member causes lateral swinging of the said member to displace the flap bodily rearwardly and to displace the flap bodily in a spanwise direction.

3. In combination, an aircraft wing, a flap forming a trailing portion of said wing, a mounting means for said flap including a flap supporting member universally coupled at its forward end to the wing, the flap being pivotally connected to the rear end of and supported by said member for downward swinging therewith from normal raised position to lowered angularly displaced positions relative to the wing, said flap being bodily movable in a spanwise direction by lateral swinging of said support member, a flap positioning member universally coupled at its forward end to the wing and universally coupled at its rear end to the flap to cause bodily rearward displacement and bodily displacement in a spanwise direction of said flap as the latter is swung downwardly with said support members from normal raised positions, and operating means for swinging the flap downwardly to angularly displaced positions.

4. In aircraft, a lift surface, a flap member movably mounted on said lift surface for vertical movement from normal position to positions angularly displaced relative to the lift surface, a mounting and supporting means for said flap member including a flap support member universally coupled to said lift surface for vertical swinging thereof with movement of said flap member to angularly displaced positions relative to the lift surface and for lateral swinging thereof to bodily displace the flap member in a direction spanwise of the lift surface as the flap member is swung vertically with said support member, said flap member being mounted on said support member for movement relative thereto about a normally vertically disposed axis, and a flap positioning member universally coupled at one end thereof to the lift surface and universally coupled at the opposite end thereof to the flap member, whereby vertical movement of said flap member with said flap support member causes lateral swinging of the support member and the positioning member to bodily displace the flap member in a direction spanwise of the lift surface, and means for vertically moving the flap member between normal positions and angularly displaced positions on and relative to the lift surface.

5. In an aircraft, opposite wings, a wing flap on each of said opposite wings, each wing flap being mounted for bodily displacement in a direction spanwise of the wing from normal position thereon to positions at which the effective span of the flap is increased over the effective span thereof in normal position, the inner ends of said flaps being spaced apart, an extensible unit connecting the spaced inner ends of the flaps to provide a flap forming continuation between said opposite flaps to provide a substantially continuous flap structure therewith, and means for bodily displacing said opposite flaps, respectively, in spanwise directions to positions of increased effective span, said extensible unit being actuated by said spanwise displacement of the flaps to maintain the flap forming continuation between and connecting said opposite flaps in all positions to which the said flaps are displaced by said means.

6. In an aircraft, opposite wings, a wing flap on each of said opposite wings and the inner ends of said opposite wings being spaced apart, each wing flap being mounted for vertical movement from normal position to positions angularly displaced relative to the wing and also being mounted for bodily displacement in a direction spanwise of the wing from normal position to positions of increased effective span on the wing, an extensible unit embodying relatively movable, coupled panels connecting the spaced inner ends of the flaps and providing a flap forming continuation between said opposite flaps to form a substantially continuous flap structure therewith, and means for simultaneously vertically moving said opposite flaps to angularly displaced positions and for bodily displacing said flaps in a spanwise direction to positions of increased effective span, the relatively movable pans of said extensible unit being actuated by said vertical movement and spanwise displacement of the opposite flaps to maintain the flap forming continuation between and connecting said opposite flaps in all positions to which the said flaps are displaced by said means.

7. In an aircraft wing, in combination, a wing flap forming a trailing under portion of the normal contour of the wing, in normal position of said flap, an aileron forming a trailing upper portion of the normal contour of the wing above said flap in normal neutral position of said aileron, said aileron being mounted to substantially up movement only for control, said wing flap being mounted for bodily displacement in a direction spanwise of the wing and beneath said aileron to positions relative to the aileron and wing at which the effective span of the flap member is increased over the effective span thereof when in normal position relative to the wing and aileron, and means for bodily displacing said wing flap in a spanwise direction to positions of increased effective span.

8. In an aircraft wing, in combination, a wing flap on the wing and extending along substantially the full span of the wing, said wing flap in normal raised position thereof forming a trailing under portion of the normal contour of the wing, an aileron on said wing and forming a trailing upper portion of the normal contour of the wing above said wing flap when the aileron is in normal neutral control position on the wing, said aileron being mounted for substantially up movement only from normal neutral position to control positions, said wing flap being mounted for movement downwardly from normal raised position to positions angularly displaced relative to said wing and also being mounted for bodily displacement in a direction spanwise of the wing and aileron to positions at which the effective span of said wing flap is increased over the effective span thereof in normal position, and means for simultaneously moving said wing flap downwardly and in a direction spanwise of the wing to a position at which the wing flap is angularly deflected relative to the wing and is bodily displaced in a spanwise direction to increase the effective span thereof.

9. In combination, a wing, a wing flap of the trailing under surface type on said wing extending along the span thereof and in normal position forming a portion of the normal contour of the wing, an aileron on the wing forming a portion of the trailing upper surface thereof above said flap and in normal neutral control position forming a portion of the normal contour of the wing, said aileron being mounted for substantially only up movement to control positions from normal neutral position and being extended a distance in a spanwise direction beyond said flap with the extended portion of said aileron substantially the full depth of the trailing portion of the wing, said flap being mounted on the wing for bodily displacement in a spanwise direction relative to the wing and to said aileron, and the tip portion of the span of said flap adjacent the extended portion of said aileron being of reduced thickness to prevent interference with said aileron when said wing flap is bodily displaced in a spanwise direction.

RANDOLPH F. HALL.